United States Patent
Tripathy et al.

(10) Patent No.: US 11,174,330 B2
(45) Date of Patent: *Nov. 16, 2021

(54) CURABLE FLUOROELASTOMER COMPOSITION

(71) Applicant: DUPONT POLYMERS, INC., Wilmington, DE (US)

(72) Inventors: Amiya Ratan Tripathy, Garnet Valley, PA (US); Peter A Morken, Wilmington, DE (US); Christopher J. Bish, Kennett Square, PA (US)

(73) Assignee: DUPONT POLYMERS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/811,860

(22) Filed: Mar. 6, 2020

(65) Prior Publication Data

US 2020/0207893 A1 Jul. 2, 2020

Related U.S. Application Data

(63) Continuation of application No. 15/771,137, filed as application No. PCT/US2015/058090 on Oct. 29, 2015, now Pat. No. 10,604,607.

(51) Int. Cl.
| | | |
|---|---|---|
| *C08F 214/18* | (2006.01) | |
| *C08K 5/32* | (2006.01) | |
| *C08K 5/30* | (2006.01) | |
| *C08K 5/00* | (2006.01) | |
| *C08K 5/33* | (2006.01) | |

(52) U.S. Cl.
CPC .............. *C08F 214/18* (2013.01); *C08K 5/30* (2013.01); *C08K 5/32* (2013.01); *C08F 2500/17* (2013.01); *C08F 2500/21* (2013.01); *C08K 5/0025* (2013.01); *C08K 5/33* (2013.01)

(58) Field of Classification Search
CPC ............... C08F 214/18; C08F 2500/17; C08F 2500/21; C08K 5/32; C08K 5/30; C08K 5/0025; C08K 5/33; C08L 27/12
See application file for complete search history.

(56) References Cited

U.S. PATENT DOCUMENTS

| | | |
|---|---|---|
| 4,281,092 A | 7/1981 | Breazeale |
| 4,394,489 A | 7/1983 | Aufdermarsh |
| 5,378,762 A | 1/1995 | Czornij et al. |
| 5,605,973 A | 2/1997 | Yamamoto et al. |
| 5,621,145 A | 4/1997 | Saito et al. |
| 5,637,648 A | 6/1997 | Saito et al. |
| 5,668,221 A | 9/1997 | Saito et al. |
| 5,789,489 A | 8/1998 | Coughlin et al. |
| 5,789,509 A | 8/1998 | Schmiegel |
| 6,281,296 B1 | 8/2001 | MacLachlan et al. |
| 6,559,231 B2 | 5/2003 | Hasegawa et al. |
| 6,638,999 B2 | 10/2003 | Bish et al. |
| 7,300,985 B2 | 11/2007 | Grootaert et al. |
| 8,338,542 B1 | 12/2012 | Bish et al. |
| 8,765,876 B2 | 7/2014 | Bish et al. |
| 9,169,339 B2 | 10/2015 | Hirano |
| 10,604,607 B2* | 3/2020 | Tripathy et al. ......... C08K 5/30 |
| 2010/0093898 A1 | 4/2010 | Campbell et al. |
| 2011/0009569 A1 | 1/2011 | Grootaert et al. |
| 2013/0072636 A1 | 3/2013 | Bish et al. |
| 2013/0345365 A1 | 12/2013 | Bish et al. |
| 2015/0094407 A1 | 4/2015 | Murai et al. |
| 2015/0099850 A1 | 4/2015 | Ikeda et al. |

FOREIGN PATENT DOCUMENTS

| | | |
|---|---|---|
| CN | 1140705 A | 1/1997 |
| CN | 104271662 A | 1/2015 |
| EP | 0708084 A1 | 4/1996 |
| EP | 3368599 A1 | 9/2018 |
| JP | 2011-516693 A | 5/2011 |
| JP | 2014-509690 A | 4/2014 |
| WO | 2004/069900 A2 | 8/2004 |
| WO | 2009/120768 A1 | 10/2009 |
| WO | 2009/126708 A1 | 10/2009 |
| WO | 2017/074395 A1 | 5/2017 |

OTHER PUBLICATIONS

Fluorocarbon Elastomer, from: Fluoroelastomers Handbook (Second Edition), 2016.*
Fluoroelastomer polymer, Encyclopedia Britannica Sep. 10, 2009.*
Benzil Dihydrazone Basic Information to Chemical Book; Chemical Books, 2008, retrieved on Dec. 9, 2015, Retrieved from Internet: <URL: http://www.chemicalbook.com/ProductChemicalPropertiesCB9248751_EN.htm>; p. 1.
International Search Report and Written Opinion in International Application No. PCT/US2015/058090, dated Jan. 14, 2016.

* cited by examiner

Primary Examiner — Irina S Zemel
(74) Attorney, Agent, or Firm — Maria Kourtakis

(57) ABSTRACT

Fluoroelastomer compositions comprising fluoroelastomers having copolymerized units of a nitrile-containing cure site monomer are cured with certain hydrazone or oxime curatives.

12 Claims, No Drawings

CURABLE FLUOROELASTOMER COMPOSITION

CROSS-REFERENCES TO RELATED APPLICATIONS

This application is a continuation of U.S. application Ser. No. 15/771,137, filed on Apr. 26, 2018, which in turn claims priority under 35 U.S.C. §§ 365 and 371 to International Application No. PCT/US2015/058090, filed on Oct. 29, 2015, each of which is incorporated herein by reference in its entirety.

FIELD OF THE INVENTION

This invention relates to curable fluoroelastomer compositions and more particularly to fluoroelastomer compositions containing certain hydrazones or oximes as curing agents.

BACKGROUND OF THE INVENTION

Fluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment that operates at high temperatures.

The outstanding properties of fluoroelastomers are largely attributable to the stability and inertness of the copolymerized fluorinated monomer units that make up the major portion of the polymer backbones in these compositions. Such monomers include vinylidene fluoride, hexafluoropropylene, tetrafluoroethylene and perfluoro(alkyl vinyl) ethers. In order to develop elastomeric properties fully, fluoroelastomers are typically crosslinked, i.e. vulcanized. To this end, a small percentage of cure site monomer is copolymerized with the fluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

Bisamidoximes (U.S. Pat. No. 5,668,221) and bisamidrazones (U.S. Pat. Nos. 5,605,973; 5,637,648) have been used as vulcanizing agents for fluoroelastomers having nitrile group cure sites. These cures may be scorchy, i.e. crosslinking may begin before the final shaping of the composition. Also, the curatives require complex, multistep syntheses from expensive starting materials.

Other nitrogen containing nucleophilic compounds have been employed to crosslink fluoroelastomers having nitrile group cure sites (U.S. Pat. No. 6,638,999 B2). Some of these curatives are scorchy while others are volatile at rubber milling temperatures.

Fluoropolymers having pendant amidrazone or amidoxime groups are also known (U.S. Pat. No. 7,300,985 B2). These polymers require an additional polymer modification step in order to form crosslinks.

Azo and amide based composition are provided in U.S. Pat. No. 9,169,339. (Daikin Industries Ltd.) which include a carbonyl group proximal to the nitrogen-nitrogen bond.

There remains a need in the industry for curable composition which provide compression set at very high temperatures in multiple environments.

SUMMARY OF THE INVENTION

The present invention is directed to curable fluoroelastomer compositions which comprise a fluoroelastomer having nitrile group cure sites and certain hydrazones or oximes as curatives. More specifically, the present invention is directed to a curable composition comprising:
A) a fluoroelastomer comprising copolymerized units of a nitrile group-containing cure site monomer; and
B) a hydrazone or oxime curing agent of the general formula $R^1(C=NY)_nR^2$ wherein n=1 or 2, Y=OH, or $NH_2$, $R^1$ is aryl, alkyl, benzyl, perfluoroalkyl, or heterocyclic and $R^2$ is aryl or heterocyclic.

Another aspect of the present invention is a cured article made from the above composition.

DETAILED DESCRIPTION OF THE INVENTION

Described herein are curing agents in compounds described herein. Also described herein are articles that have been cured and which, before curing, comprised such compounds. Also, described herein are processes for curing the compounds described herein.

The fluoroelastomer that may be employed in the composition of the invention may be partially fluorinated or perfluorinated. Fluoroelastomers preferably contain between 25 and 70 weight percent, based on the total weight of the fluoroelastomer, of copolymerized units of a first monomer which may be vinylidene fluoride (VF2) or tetrafluoroethylene (TFE). The remaining units in the fluoroelastomers are comprised of one or more additional copolymerized monomers, different from said first monomer, selected from the group consisting of fluoromonomers, hydrocarbon olefins and mixtures thereof. Fluoromonomers include fluorine-containing olefins and fluorine-containing vinyl ethers.

Fluorine-containing olefins which may be employed to make fluoroelastomers include, but are not limited to vinylidene fluoride (VF2), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE) and vinyl fluoride.

Fluorine-containing vinyl ethers that may be employed to make fluoroelastomers include, but are not limited to perfluoro(alkyl vinyl) ethers. Perfluoro(alkyl vinyl) ethers (PAVE) suitable for use as monomers include those of the formula

  (I)

where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl) ethers includes compositions of the formula

  (II)

where X is F or $CF_3$, n is 0-5, and $R_f$ is a perfluoroalkyl group of 1-6 carbon atoms.

A most preferred class of perfluoro(alkyl vinyl) ethers includes those ethers wherein n is 0 or 1 and $R_f$ contains 1-3 carbon atoms. Examples of such perfluorinated ethers include perfluoro(methyl vinyl ether) (PMVE), perfluoro(ethyl vinyl ether) (PEVE) and perfluoro(propyl vinyl ether) (PPVE). Other useful monomers include those of the formula

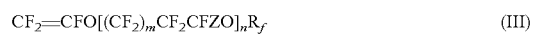  (III)

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl) ether monomers include compounds of the formula $$CF_2=CFO[(CF_2CF\{CF_3\}O)_n(CF_2CF_2CF_2O)_m(CF_2)_p]C_xF_{2x+1} \quad (IV)$$

where m and n independently=0-10, p=0-3, and x=1-5. Preferred members of this class include compounds where n=0-1, m=0-1, and x=1.

Other examples of useful perfluoro(alkyl vinyl ethers) include $$CF_2=CFOCF_2CF(CF_3)O(CF_2)_mC_nF_{2n+1} \quad (V)$$

where n=1-5, m=1-3, and where, preferably, n=1.

If copolymerized units of PAVE are present in fluoroelastomers employed in the invention, the PAVE content generally ranges from 25 to 75 weight percent, based on the total weight of the fluoroelastomer. If perfluoro(methyl vinyl ether) is used, then the fluoroelastomer preferably contains between 30 and 65 wt. % copolymerized PMVE units.

Hydrocarbon olefins useful in the fluoroelastomers employed in the invention include, but are not limited to ethylene and propylene. If copolymerized units of a hydrocarbon olefin are present in the fluoroelastomers, hydrocarbon olefin content is generally 4 to 30 weight percent.

The fluoroelastomer further contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2-12, preferably 2-6;

$$CF_2=CF-O[CF_2-CFCF_3-O]_n-CF_2-CFCF_3-CN \quad (VII)$$

where n=0-4, preferably 0-2;

$$CF_2=CF-[OCF_2CFCF_3]_x-O-(CF_2)_n-CN \quad (VIII)$$

where x=1-2, and n=1-4; and $$CF_2=CF-O-(CF_2)_n-O-CF(CF_3)CN \quad (IX)$$

where n=2-4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

A first aspect of this invention is a curable composition comprising a fluoroelastomer comprising copolymerized units of a cure site monomer selected from the group consisting of nitrile-containing fluorinated olefins and nitrile-containing fluorinated vinyl ethers; and a certain hydrazone or oxime. The hydrazones or oximes may be a mono- or di-, hydrazones or oximes and included as curing agents.

The hydrazones or oximes are of the general formula $R^1(C=NY)_nR^2$, wherein n=1 or 2, Y=OH, or $NH_2$, $R^1$ is aryl, alkyl, perfluoroalkyl, or heterocyclic, and $R^2$ is aryl or heterocyclic. When $R^1$ and $R^2$ are both aryl, they may be fused such as a fluoroenyl group (see Example 3 herein). The alkyl, aryl, benzyl, perfluroakyl or heterocycle groups may contain additional functional groups such as, but not limited to halogen, ether, or amide groups. The perfluoroalkyl group has at least one of the hydrogen atoms replaced by fluorine. Compounds that decompose to form one of these hydrazones or oximes may also be employed in the composition of the invention. The hydrazones or oximes may also be a salt, e.g. hydrochloride.

Preferred hydrazones or oximes include those wherein n is 1; $R^1$ is aryl and $R^2$ is aryl. A most preferred curative composition includes curing agent wherein n=2 and the curing agent is $C_6H_5(C=NNH_2)_2C_6H_5$.

It is theorized that these hydrazones of the present invention act as curing agents by causing the dimerization of polymer chain bound nitrile groups to form 1,2,4-triazole rings, thus crosslinking the fluoroelastomer. The hydrazones of the present invention are less volatile than curatives such as hydrazine or t-butyl carbazate, making the curatives less likely to be fugitive during mixing and shaping processes.

In order to be useful as either the major, or as the only curative for these fluoroelastomers, the level of hydrazones or oximes should be about 0.05 to 7 parts hydrazone or oxime per 100 parts fluoroelastomer, preferably about 0.1 to 3 parts hydrazone or oxime per 100 parts fluoroelastomer, most preferably about 0.5 to 2 parts hydrazone or oxime per 100 parts fluoroelastomer. As used herein, "parts" refers to parts by weight, unless otherwise indicated.

An appropriate level of hydrazone or oxime can be selected by considering cure properties, for example the time to develop maximum moving die rheometer (MDR) torque and minimum Mooney scorch of the curable compositions. The optimum level will depend on the particular combination of fluoroelastomer and hydrazone or oxime.

Optionally, a curative accelerator, e.g. a compound that releases ammonia at curing temperatures, may be used in combination with an hydrazone or oxime curative. Examples of compounds that decompose to release ammonia at curing temperatures include those disclosed in U.S. Pat. No. 6,281,296 B1 and U.S. 2011/0009569.

Optionally, another curative commonly employed to crosslink fluoroelastomers having nitrile-group cure sites may be used in addition to the hydrazones or oximes. Examples of such other curatives include, but are not limited to diaminobisphenol AF, 2,2-bis(3-amino-4-anilinophenyl) hexafluoropropane, mono- or bis-amidines, mono- or bis-amidrazones, mono- or bis-amidoximes, or an organic peroxide plus coagent.

Additives, such as carbon black, fluoropolymer micropowders, stabilizers, plasticizers, lubricants, fillers, and processing aids typically utilized in fluoroelastomer compounding can be incorporated into the compositions of the present invention, provided they have adequate stability for the intended service conditions.

The curable compositions of the invention may be prepared by mixing the fluoroelastomer, hydrazones or oximes and other components using standard rubber compounding procedures. For example, the components may be mixed on a two roll rubber mill, in an internal mixer, for example, a Banbury® internal mixer, or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 300° C. for several hours.

The hydrazone curable compositions of the present invention are useful in production of cured articles such as gaskets, tubing, and seals. The cured articles are generally produced by molding a compounded formulation of the curable composition with various additives under pressure, curing the part, and then subjecting it to a post cure cycle. The cured compositions have excellent thermal stability, steam and chemical resistance. Volume swell (ASTM D1414) after exposure to 225° C. water for at least 168 hours, preferably at least 336 hours, is less than 1%. Also compression set, 300° C., 70 hours, 15% compression (ASTM D395) is less than 70%. The cured compositions are particularly useful in applications such as seals and gaskets for manufacturing semiconductor devices, and in seals for high temperature automotive uses.

Other fluoropolymers containing nitrile cure sites, such as fluoroplastics may be substituted for fluoroelastomers in the compositions of the invention.

The invention is now illustrated by certain embodiments wherein all parts are by weight unless otherwise specified.

EXAMPLES

Test Methods

Cure Characteristics

Cure characteristics were measured using a Monsanto MDR 2000 instrument under the following conditions:
Moving die frequency: 1.66 Hz
Oscillation amplitude: ±0.5 degrees
Temperature: 190° C., unless otherwise noted
Sample size: Disks having diameter of 1.5 inches (38 mm)
Duration of test: 30 minutes
The following cure parameters were recorded:
$M_H$: maximum torque level, in units of dN·m
$M_L$: minimum torque level, in units of dN·m
Tc90: time to 90% of maximum torque, minutes Test specimens were prepared from elastomer compounded with appropriate additives, as described in the formulations listed in the Examples below. Compounding was carried out on a rubber mill. The milled composition was formed into a sheet and a 10 g sample was die cut into a disk to form the test specimen.

Compression set of O-ring samples was determined in accordance with ASTM D395. Mean values are reported.

Volume swell in water was measured at 225° C. for the time indicated in the Tables in accordance with ASTM D1414.

The following fluoroelastomer polymers were used in the Examples:
FFKM—A terpolymer containing 61.8 mole percent units of TFE, 37.4 mole percent units of PMVE and 0.80 mole percent units of 8-CNVE was prepared according to the general process described in U.S. Pat. No. 5,789,489.

Examples 1-3

Curable compositions of the invention were compounded on a two-roll rubber mill in the proportions shown in Table I. The compounded compositions are labeled Example 1 (Benzil dihydrazone, CAS #4702-78-7, available from Sigma-Aldrich), Example 2 (Benzophenone hydrazone, CAS #5350-57-2, available from Sigma-Aldrich) and Example 3 (9-fluorenone hydrazone, CAS #13629-22-6, available from Alfa-Aesar) in Table I. Cure characteristics of the compounded compositions are also shown in Table I. O-rings were made by press curing the curable compositions at a temperature of 190° C. for Tc90 plus 5 minutes, followed by a post cure in a nitrogen atmosphere at a temperature of 305° C. for 26 hours after a slow temperature ramp up from room temperature. Compression set and volume swell values are also shown in Table I.

TABLE I

|  | Example 1 | Example 2 | Example 3 |
|---|---|---|---|
| Formulation (phr[1]) |  |  |  |
| FFKM -Polymer | 100 | 100 | 100 |
| Carbon Black MT N990 | 30 | 30 | 30 |
| Benzil dihydrazone (CAS # 4702-78-7) | 1.0 | 0 | 0 |
| Benzophenone hydrazone (CAS # 5350-57-2) | 0 | 1.7 | 0 |
| 9-fluorenone hydrazone (CAS # 13629-22-6) | 0 | 0 | 1.5 |
| Cure Characteristics @ 190° C. |  |  |  |
| $M_L$ (dN · m) | 3.36 | 2.56 | 2.36 |
| $M_H$ (dN · m) | 20.5 | 12.6 | 16.67 |
| Tc90, minutes | 20.1 | 15.8 | 15.1 |
| Compression set, % in distilled water at 250° C., 70 hours compression, 15% | 73 | 78 | 76 |
| Compression set, %, in distilled water at 225° C., 168 hours compression, 15% | 74 | 82 | 80 |
| Compression set, 300° C., 70 hours, compression, 15% | 33 | 19 | 28 |
| Volume swell, % in distilled water at 225° C., 168 hours | 0.32 | 0.36 | 0.91 |

[1]Parts by weight per hundred parts by weight perfluoroelastomer

Comparative Examples 1 and 2

Compositions of the invention were compounded on a two-roll rubber mill in the proportions shown in Table II. The compounded compositions are labeled Comparative Examples 1 and 2 (benzil monohydrazone, CAS #5344-88-7, available from Acros Organics), Cure characteristics of the compounded compositions are also shown in Table II.

TABLE II

| Formulation (phr) | Comparative Example 1 | Comparative Example 2 | Example 4 |
|---|---|---|---|
| FFKM | 100 | 100 | 100 |
| Carbon Black MT N990 | 30 | 30 | 50 |
| Benzil monohydrazone (CAS # 5344-88-7) | 1.0 | 2.0 | 0 |
| Benzophenone oxime (CAS # 574-66-3) | 0 | 0 | 1.35 |
| Cure Characteristics | @ 190° C. | @ 190° C. | @ 200° C. |
| $M_L$ (dN · m) | 1.97 | 1.81 | 4.59 |
| $M_H$ (dN · m) | 3.47 | 4.41 | 6.9 |
| Tc90, minutes | 25 | 25 | 13.98 |

As illustrated by Comparative Examples 1 and 2, a curative with a carbonyl group adjacent to hydrazone group is not an effective crosslinking agent as evident from the very low $M_H$ (dN·m) value in Table II.

What is claimed is:

1. A curable composition comprising:
    A) a fluoroelastomer comprising copolymerized units of vinylidene fluoride or tetrafluoroethylene; and copolymerized units of a nitrile group-containing cure site monomer; and
    B) a hydrazone or oxime of the general formula $R^1(C{=}NY)_nR^2$ wherein n=1 or 2, Y=OH, or $NH_2$, $R^1$ is aryl, alkyl, perfluoroalkyl, benzyl or heterocyclic and $R^2$ is aryl or heterocyclic.

2. The curable composition of claim 1, wherein n is 1; $R^1$ is aryl, $R^2$ is aryl and Y is $NH_2$.

3. The curable composition of claim 1, wherein n is 1; $R^1$ is aryl, $R^2$ is aryl and Y is OH.

4. The curable composition of claim 1 wherein n is 1; $R^1$ is aryl or heterocyclic, $R^2$ is aryl and Y is $NH_2$.

5. The curable composition of claim 1 wherein n=2 and the hydrazone is $C_6H_5(C{=}NNH_2)_2C_6H_5$.

6. The curable composition of claim 1, wherein $R^1$ and $R^2$ are aryl and fused together to form a fluoroenyl, and Y is $NH_2$.

7. The curable composition of claim 1, wherein an appropriate level of hydrazone or oxime is selected by the time necessary to develop maximum moving die rheometer (MDR) torque and minimum Mooney scorch of the curable composition.

8. The curable composition of claim 7, wherein a carbonyl group is not adjacent to the hydrazone or oxime.

9. A cured article made from the composition of claim 1.

10. A cured article made from the composition of claim 8.

11. A curable composition consisting of:
    A) a fluoroelastomer comprising
        copolymerized units of vinylidene fluoride or tetrafluoroethylene; and
        copolymerized units of a nitrile group-containing cure site monomer; and
    B) a hydrazone of the general formula $R^1(C{=}NNH_2)_nR^2$ wherein n=1 or 2, and $R^1$ is aryl, alkyl, perfluoroalkyl, or heterocyclic and $R^2$ is aryl or heterocyclic.

12. A cured article made from the composition of claim 11 having a volume swell, measured according to ASTM D1414, after exposure to 225° C. water for at least 168 hours of less than 1% and a compression set, 300° C., 70 hours, 15% compression, measured according to ASTM D395, of less than 70%.

* * * * *